United States Patent [19]

Niwa

[11] 4,058,715
[45] Nov. 15, 1977

[54] SERIAL FFT PROCESSING UNIT
[75] Inventor: Kunihiko Niwa, Tokyo, Japan
[73] Assignee: Nippon Electric Company, Ltd., Tokyo, Japan
[21] Appl. No.: 697,659
[22] Filed: June 18, 1976
[30] Foreign Application Priority Data
June 20, 1975 Japan ................................. 50-76216
[51] Int. Cl.² ........................................... G06F 15/34
[52] U.S. Cl. ................................................ 364/726
[58] Field of Search ....................... 235/156, 152, 164
[56] References Cited
U.S. PATENT DOCUMENTS

| | | | |
|---|---|---|---|
| 3,588,460 | 6/1971 | Smith | 235/156 |
| 3,686,490 | 8/1972 | Goldstone | 235/156 |
| 3,899,667 | 8/1975 | Simone | 235/156 |

Primary Examiner—David H. Malzahn
Attorney, Agent, or Firm—Sughrue, Rothwell, Mion, Zinn and Macpeak

[57] ABSTRACT

An FFT processing unit of simplified construction comprises one or more arithmetic stages serially connected. Each stage has a plurality of recursive arithmetic paths each consisting of a delay element, a simplified multiplier for multiplying by $\pm 1$ and $\pm j$ where $j = \sqrt{-1}$, and an adder. The adder is supplied with a serial input digital data series and the output is provided to the delay element and multiplier connected in series. A switch successively selects the output signals obtained from the plurality of recursive arithmetic paths. A second multiplier multiplies the signals selected by the switch by predetermined coefficients.

12 Claims, 11 Drawing Figures

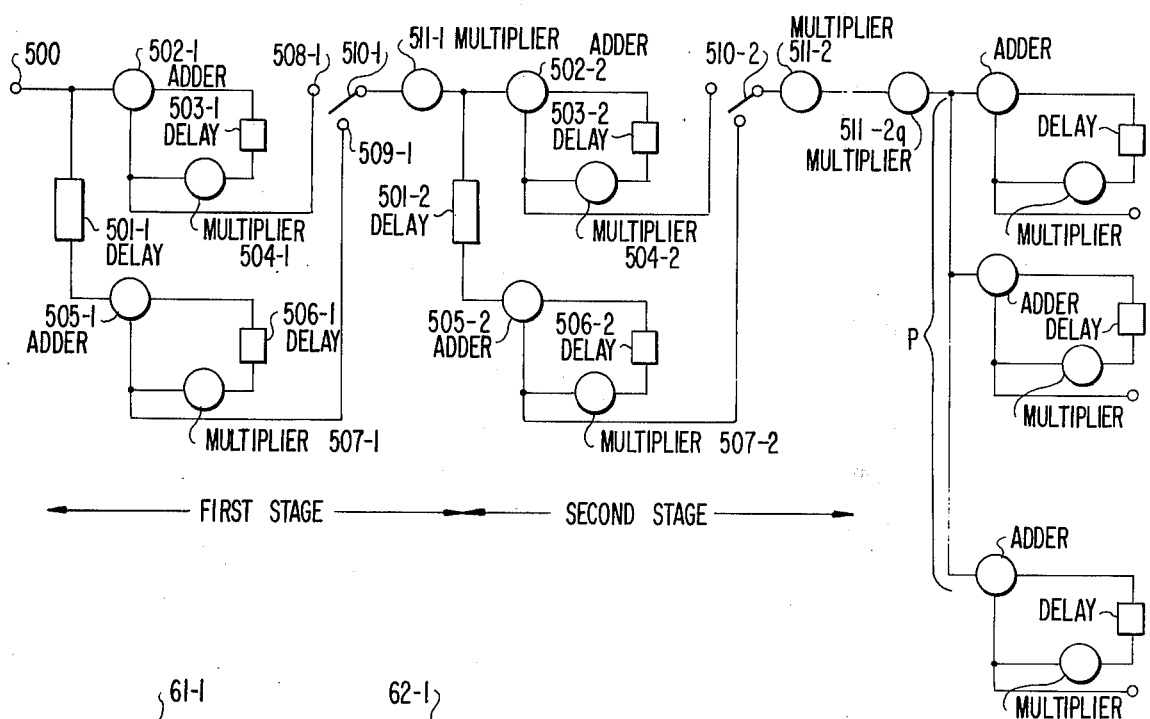
FIG.5
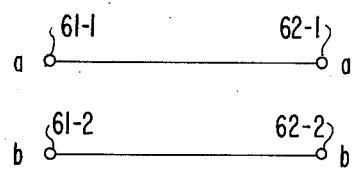
FIG.6A  (x(1))
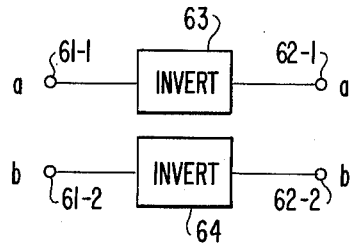
FIG.6B  (x(-1))
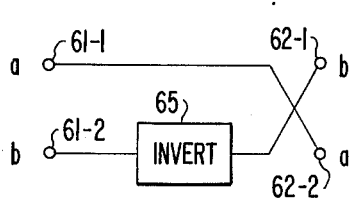
FIG.6C  (x(j))
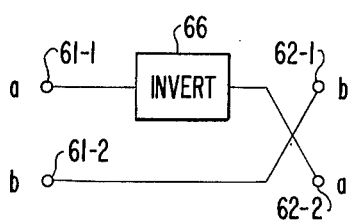
FIG.6D  (x(-j))

SERIAL FFT PROCESSING UNIT

BACKGROUND OF THE INVENTION

The present invention relates to an arithmetic unit, and more particularly to an FFT (Fast Fourier Transform) processing unit for performing FFT processing in response to input digital data successively supplied in serial form. FFT processing is, among other uses, utilized in the detection of particular frequency components in a speech signal analyzing system.

FFT processing is a high speed operation for performing with high efficiency DFT (Discrete Fourier Transform) processing, that is, an operation for detecting particular frequency components from a time series consisting of a number of sample values. This operation (FFT) is very frequently utilized in various communications and signal processing fields. One typical example of this operation can be seen in the analysis of speech signals in which after a speech signal has been sampled and subjected to analogue-digital conversion, particular frequency components involved in the speech signal can be detected by performing said DFT processing. Assuming here that the number of input data (sampled values of a speech waveform) used for DFT processing in N, $N^2$ multiplications are needed to compute the DFT $\{X_l\}$ ($l=0, 1, 2, \ldots N-1$) from the N-point input digital data series $\{x_k\}$ ($k=0, 1, 2, \ldots N-1$). FFT processing is employed as an arithmetic approach for greatly reducing the number of multiplications. General descriptions on DFT and FFT are given in detail in Chapter 6 of *Digital Processing of Signals* published in 1969 by McGraw-Hill Book Co., Inc. (Reference 1), and so, their detailed descriptions will be omitted.

In most cases, the aformentioned input digital data series $\{x_k\}$ are successively applied to an input terminal in serial form, and FFT processing upon this data series is performed for computation of $\{X_l\}$. Heretofore, one conventional processing unit used in such a case has disadvantages in that its circuit structure and control operations are fairly complicated shown in FIG. 6 of an article titled "Digital Matched Filters Using Fast Fourier Transform" published in the *Proceedings of EASCON* on pages 222–230, 1971 (Reference 2).

SUMMARY OF THE INVENTION

One object of the present invention is to provide a processing unit suitable for performing FFT processing upon receipt of serial input digital data.

Another object of the present invention is to provide the above-mentioned processing unit with a small-size circuit and simple construction based on simple control operations.

However, the application of the present invention is not restricted to FFT processing but it is also applicable to an apparatus for performing similar operations such as inverse FFT processing.

The present FFT processing unit comprises one or more arithmetic stages serially connected each having a plurality of recursive arithmetic paths each consisting of a delay element, a simplified multiplier means adapted to be fed with an output signal obtained from the delay element for multiplying by $\pm 1$ and $\pm j$ where $j$ is equal to $\sqrt{-1}$, and an adder means adapted to be fed with a serial input digital data series and an output signal of the multiplier means at its first and second input terminals, respectively, and to feed its output signal to an input terminal of the delay element, said recursive arithmetic paths being connected in parallel so that said serial input digital data series are supplied at their respective input terminals; a switch means for successively selecting output signals obtained from the plurality of recursive arithmetic paths; and a second multiplier means for multiplying input signals given through the switch means by predetermined coefficients.

BRIEF DESCRIPTION OF THE DRAWINGS

Now, the present invention will be described in more detail in conjunction with the accompanying drawings, in which:

FIG. 5 shows a schematic circuit diagram of another embodiment of the present invention;

FIGS. 6A to 6D illustrate detailed constructions of the simplified multiplier shown in FIGS. 4 and 5.

DESCRIPTION OF THE PREFERRED EMBODIMENT

Figure 1:
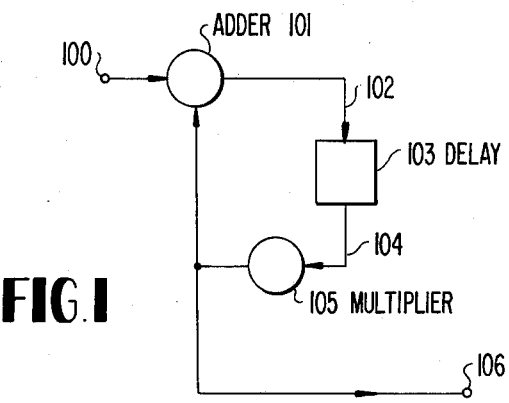
FIGS. 1, 1A, 2 and 3 show schematic diagrams of structual elements used in the present FFT processing unit.

Before getting into the explanation of the operations of the embodiments of the present invention, the principle of the present invention will be explained in terms of mathematical formulae.

First, as disclosed in an article titled "Matrix Description of the Fast Fourier Transform" published in *IEEE Transactions on Audio and Electroacoustics*, Vol. AU-18, No. 4, pp. 442–450, 1970 (Reference 3), the computing operation of DFT $\{X_l\}$ ($l=0, 1, 2 \ldots N-1$) at N points from the N-point input digital data series $\{x_k\}$ ($k=0, 1, 2 \ldots N-1$) is expressed by the following matrix representation:

$$\begin{pmatrix} X_0 \\ X_1 \\ X_2 \\ \vdots \\ X_l \\ \vdots \\ X_{N-1} \end{pmatrix} = \begin{pmatrix} W^0 & W^0 & W^0 & \cdots & W^0 \\ W^0 & W^1 & W^2 & \cdots & W^{N-1} \\ W^0 & W^2 & W^4 & \cdots & W^{2(N-1)} \\ \vdots & \vdots & \vdots & & \vdots \\ W^0 & W^l & W^{2l} & & W^{(N-1)l} \\ \vdots & \vdots & \vdots & & \vdots \\ W^0 & W^{N-1} & W^{2(N-1)} & & W^{(N-1)(N-1)} \end{pmatrix} \begin{pmatrix} x_0 \\ x_1 \\ x_2 \\ \vdots \\ x_k \\ \vdots \\ x_{N-1} \end{pmatrix} \quad (1)$$

$$= A \cdot t_x$$

where $$W = \exp(-j\frac{2\pi}{N}) \quad (2)$$

$$x = (x_0, x_1, x_2 \ldots x_{N-1}) \quad (3)$$

Here, although a method of resolving equation (1) into two groups and a method of partitioning equation (1) into four groups are taken, the latter case will be mainly described in detail. Assuming now that the number of data points N is a multiple of 4, equation (1) can be partitioned into four groups identified by a suffix $n$ ($=0, 1, 2, 3$) as follows:

$$\begin{Bmatrix} X_n \\ X_{n+4} \\ X_{n+8} \\ \vdots \\ X_{n+4l} \\ \vdots \\ X_{n+4(M-1)} \end{Bmatrix} = \begin{Bmatrix} W^0 & W^n & W^{2n} & \cdots & W^{(N-1)n} \\ W^0 & W^{n+4} & W^{2(n+4)} & \cdots & W^{(N-1)(n+4)} \\ W^0 & W^{n+8} & & & \vdots \\ \vdots & \vdots & & & \vdots \\ W^0 & W^{n+4l} & & \cdots & W^{(N-1)(n+4l)} \\ \vdots & \vdots & & & \vdots \\ W^0 & W^{n+4(M-1)} & & & W^{(N-1)\{n+4(M-1)\}} \end{Bmatrix} \cdot t_x \qquad (4)$$

$n = 0, 1, 2, 3$ where $$M = N/4 \qquad (5)$$

Next, for simplicity, equation (4) is represented as follows:

$$t_{X_n} = B_n \cdot t_x \qquad (6)$$

Symbol $B_n$ represents an M × N matrix and this can be modified as follows:

$$B_n = \begin{Bmatrix} W^0, W^n, \ldots, W^{(M-1)n}, W^{Mn}, W^{(2M-1)n}, W^{2Mn}, W^{(3M-1)n}, W^{3Mn}, W^{(N-1)n} \\ W^0, W^{n+4}, \ldots, W^{(M-1)(n+4)}, W^{M(n+4)}, W^{(2M-1)(n+4)}, W^{2M(n+4)} \\ \vdots \\ W^0, W^{n+4(M-1)} - - - - - - - - - - - - - - - - - W^{(N-1)\{n+4(M-1)\}} \end{Bmatrix} \qquad (7)$$

$$= \begin{Bmatrix} W^0, W^n, ---, W^{(M-1)n}, (-j)^n, (-j)^n W^n, (-j)^{2n}, (-j)^{3n}, (-j)^{3n} W^{(M-1)n} \\ W^0, W^{n+4}, ---, (-j)^n, (-j)^n W^{n+4}, (-j)^{2n}, (-j)^{3n}, (-j)^{3n} W^{(M-1)(n+4)} \\ \vdots \\ W^0, W^{n+4(M-1)}, (-j)^n, (-j)^n W^{n+4(M-1)}, (-j)^{2n}, (-j)^{3n}, (-j)^{3n} W^{(M-1)\{n+4(M-1)\}} \end{Bmatrix}$$

$$C_n$$

$$= \begin{Bmatrix} W^0, W^n, ---, W^{(M-1)n} \\ W^0, W^{n+4}, ---, W^{(M-1)(n+4)} \\ W_0, W^{n+8}, ---, W^{(M-1)(n+8)} \\ \vdots \\ W_0, W^{n+4(M-1)}, , W^{(M-1)\{n+4(M-1)\}} \end{Bmatrix}$$

$$D_n$$

$$\cdot \begin{Bmatrix} 1, 0, 0, ---, 0, (-j)^n, 0, ---0, (-j)^{2n}, 0, ---0, (-j)^{3n}, 0, ---, 0 \\ 0, 1, 0, ---, 0, 0, (-j)^n ---0 \\ 0, 0, 1, ---, 0, \\ \vdots \\ 0, 0, ---, 1, 0, ---0, (-j)^n, 0, --- 0, (-j)^{2n}, 0, ---0, (-j)^{3n} \end{Bmatrix}$$

$$= C_n \cdot D_n$$

Further modifying matrix $C_n$, the following equation is obtained:

$$C_n = \begin{pmatrix} W^0, & W^0, & ---, & W^0 \\ W^0, & W^n, & ---, & W^{n(M-1)} \\ W^0, & W^{2n}, & ---, & W^{2n(M-1)} \\ & & \ddots & \\ W^0, & W^{n(M-1)}, & ----, & W^{n(M-1)(M-1)} \end{pmatrix} \cdot \begin{pmatrix} W^0, & 0, & ---, & 0 \\ 0, & W^n, & 0, & ---, & 0 \\ & 0, & W^{2n}, & ---, & 0 \\ & & & \ddots & \\ & & & & 0 \\ 0 & ---, & 0, & W^{(M-1)n} \end{pmatrix} \quad (8)$$

$$= E_n \cdot F_n$$

That is, equation (6) is modified into the following form:

$$t_{X_n} = E_n \cdot F_n \cdot D_n \cdot t_x \quad (9)$$

In equation (9), matrix $D_n$ is represented as follows:

$$D_n = \begin{pmatrix} 1 & 0 & ---- & 0 & (-j)^n 0 & ---- & 0 (-j)^{2n} 0 & ---- & 0 (-j)^{3n} 0 & ---- & 0 \\ 0 & 1 & ---- & 0 & (-j)^n 0 & ---- & 0 (-j)^{2n} 0 & ---- & 0 (-j)^{3n} 0 & ---- & 0 \\ & & \ddots & & & & & & & & \\ 0 & ---- & 1 & 0 & & (-j)^n 0 & & (-j)^{2n} 0 & & (-j)^{3n} & \end{pmatrix}$$

$$= \begin{pmatrix} (j)^{4n} 0 & ---- & 0 (j)^{3n} 0 & ---- & 0 (j)^{2n} 0 & ---- & 0 (j)^n 0 & ---- & 0 \\ 0 (j)^{4n} & ---- & 0 (j)^{3n} & ---- & 0 (j)^{2n} & ---- & 0 (j)^n & & , 0 \\ & & & & & & & & & \\ 0 & ---- & (j)^{4n} & ---- & (j)^{3n} & ---- & (j)^{2n} & ---- & (j)^n \end{pmatrix}$$

Here, we denote as follows:

$$\left.\begin{aligned} t_{y_n} &= D_n \cdot t_x \\ y_n &= (y_0, y_1, y_2, ---, y_{M-1}) \end{aligned}\right\} \quad (11)$$

In FIG. 1 which shows the circuit structure for realizing an operation corresponding to matrix $D_n$ in equation (10), N input data $x$ (complex numbers) are successively given to an input terminal 100 in serial form. An adder 101 adds each datum $x$ to a signal fed back thereto through a delay element 103 for delaying a period of $M$ ($= N/4$) data and through a multiplier 105 for multiplying by a coefficient $(j)^n (n = 0, 1, 2$ or $3)$. Thus, a signal 102 is produced from the adder 101. It is to be noted that the adder 101, delay element 103 and multiplier 105 must be provided corresponding to the real and imaginary terms of the input complex data as practical hardware. However, each structual element is represented as a single element in the drawing for simplicity.

An output signal obtained from the multiplier 105 appears at a terminal 106, but as will be seen from equations (10) and (11), significantly necessary data $y_n$ are only the output signals appearing during the period when the last successive $N/4$ data of the N input digital data are applied to the input terminal 100. In addition, the multiplier 105 of the circuit shown in FIG. 1 only multiplies by a coefficient $(j)^n$, that is, $1, j, -1$, or $-j$, and so, an ordinary complicated multiplier is unnecessary there. For instance, in the case where a given complex datum $(a + jb)$ is multiplied by $j$, since $j(a + jb)$ is equal to $-b + ja$, multiplication of $(a + jb)$ by $j$ is equivalent to the operations of mutually interchanging the real term $a$ and the imaginary term $b$ and then inverting the polarity of the interchanged real term $b$.

Figure 1A:
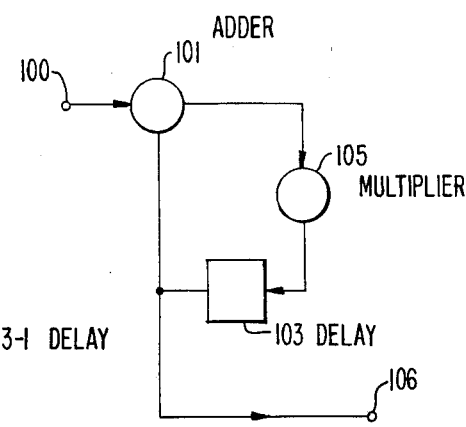

FIGS. 6A, 6B, 6C and 6D illustrate examples of hardware implementation of the simplified multiplier 105 of FIG. 1 adapted to multiply $1, -1, j$ and $-j$, respectively. In any one of these figures, the real term of a multiplicand is given to an input terminal 61-1, while to an input terminal 61-2 is applied the imaginary term of a multiplicand. In addition, a real term of the product appears at an output terminal 62-1, while at an output terminal 62-2 appears an imaginary term of the product. In these figures, reference numerals 63 to 66 designate polarity inverter circuits for the input digital data. The constructions of these polarity inverter circuits structurally differ from each other depending upon the format and the code form of the input data. If the input data are supplied to the input terminal in serial form starting with the LSB (least significant bit) and if the code is represented by two's-complement (for instance, the two's complement of a binary number 11010 is given as 00110), the circuit shown in FIG. 8 on page 416 of an article titled "An Approach to the Implementation of Digital Filters" published in *IEEE Transactions on Audio and Electroacoustics*, Vol. AU-16, No. 3, September 1968, pp. 413-421 Reference 4), can be used. Whatever format and code form may be employed, the polarity inverter circuits can be composed of very simple hardware consisting of one flip-flop and a few gates or so. Accordingly, it can be seen how the multiplier for multiplying $1, -1, j$ and $-j$ is simple. In contrast, an ordinary multiplier composed of a large number of flip-flops, adders and gates as illustrated in FIGS. 10 and 11 on page 417 of Reference 4 has a complicated hardware structure. This implies that to make such ordinary multiplier unnecessary contributes to great hardware reduction. Also, it is to be noted that as shown in FIG. 1A a similar operation to that performed by the structure of FIG. 1 can be done by interchanging the delay element 103 and the multiplier 105 with each other because of their serial connection.

Then, if we denote, $$t_{u_n} = F_n \cdot t_{y_n} \tag{12}$$

this operation is equivalent to successive multiplication of $y_n$ by coefficients $W^0$, $W^n$, $W^{2n}$ ... $W^{(M-1)n}$, respectively, because matrix $F_n$ is a diagonal matrix represented by equation (8).

Figure 2:
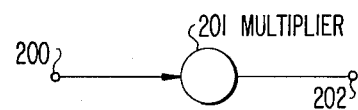

In FIG. 2 illustrating the circuit structure for performing this operation, data $y_n$ are successively given in serial form through an input terminal 200, and after the data are multiplied by a predetermined coefficient by a multiplier 201, they are derived from an output terminal 202. The multiplier 201 successively multiplies M data ($y_0, y_1, y_2, \ldots y_{M-1}$) of $y_n$ by the coefficients $W^0$, $W^n$, $W^{2n}$ ... $W^{(M-1)n}$, respectively.

Now, we can denote, $$t_{X_n} = E_n \cdot t_{u_n} \tag{13}$$

and matrix $E_n$ represented by equation (8) is modified as shown in the following equation (14):

$$E_n = \begin{pmatrix} W^0 & W^0 & \cdots & W^0 \\ W^{-4M} & W^{-4(M-1)} & \cdots & W^{-4} \\ W^{-8M} & W^{-8(M-1)} & \cdots & W^{-8} \\ \vdots & & & \\ W^{-4(M-1)M} & \cdots & & W^{-4(M-1)} \end{pmatrix} \tag{14}$$

Figure 3:
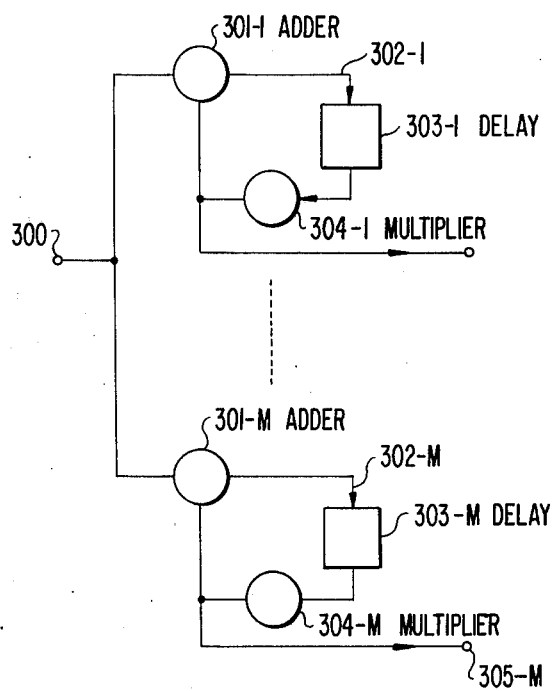

In FIG. 3 which shows the circuit for realizing the operation of matrix $E_n$ represented by equation (14), input signals $u_n$ are sequentially applied to an input terminal 300 in serial form. The input signals are then processed in M recursive arithmetic paths each consisting of an adder 301, one-datum delay element 303, and a multiplier 304. Resultant $X_n$ appear at output terminals 305-1 to 305-M.

In order to obtain the output $X_n$ ($n=0, 1, 2, 3$) from the N input digital data $x$, what is needed is to connect the circuits shown in FIGS. 1, 2 and 3 in cascade. Here it is to be noted that while N = 4M data are supplied to the input terminal 100 of the circuit shown in FIG. 1, the significantly necessary output signals are obtained only during the time interval when the last successive M data are given to the input terminal 100. As a result, during the other time intervals the output signals of the circuit shown in FIG. 1 are not needed. Accordingly, the multiplier of FIG. 2 need not operate for the latter time intervals. Therefore, by using this idle time of the multiplier, the multiplier can be used in common to all groups of $n = 0, 1, 2, 3$.

Now comparing matrix A with matrix $E_n$, it is seen that matrix $E_n$ is no more than a $M(=N/4) \times M$ matrix composed by picking up the elements at every fourth row and every fourth column in matrix A.

If M is again a multiple of 4, by repeating the above-described operation once more upon matrix $E_n$, it can be further partitioned into four groups each of which is represented by a matrix of $\frac{1}{4}$ in size.

If $N = 4^q \times P$ ($P \neq$ multiple of 4) is given, the aforementioned operations can be repeated $q$-times while successively partitioning into smaller matrices of $\frac{1}{4}$ in size, and finally, it is partitioned as represented by equation (15) corresponding to equation (8).

$$\begin{pmatrix} W^0 & W^0 & W^0 & \cdots & W^0 \\ W^0 & W^{\frac{N}{P}} & W^{\frac{2N}{P}} & \cdots & W^{\frac{P-1}{P}N} \\ W^0 & W^{\frac{2N}{P}} & & & \\ \vdots & & & & \\ W^0 & W^{\frac{P-1}{P}N} & & & W^{\frac{(P-1)^2}{P}N} \end{pmatrix} \begin{pmatrix} W^0 & 0 & 0 & \cdots & 0 \\ 0 & W^n & 0 & & \\ 0 & 0 & W^{2n} & & 0 \\ \vdots & & & \ddots & \\ 0 & & \cdots & & W^{(P-1)n} \end{pmatrix} \tag{15}$$

$$= \begin{pmatrix} W^0 & W^0 & & W^0 & \cdots & W^0 \\ W^0 & W^{-\frac{P-1}{P}N} & & \cdots & & W^{-\frac{N}{P}} \\ W^0 & W^{-\frac{2(P-1)N}{P}} & & \cdots & & W^{-\frac{2N}{P}} \\ \vdots & & & & & \\ W^0 & W^{-\frac{(P-1)^2}{P}N} & & \cdots & & W^{-\frac{P-1}{P}N} \end{pmatrix} \begin{pmatrix} W^0 & 0 & 0 & \cdots & 0 \\ 0 & W^n & 0 & & \\ 0 & 0 & W^{2n} & & \\ \vdots & & & \ddots & \\ 0 & & \cdots & & W^{(P-1)n} \end{pmatrix}$$

$n = 0, 1, 2, 3$

Figure 4:
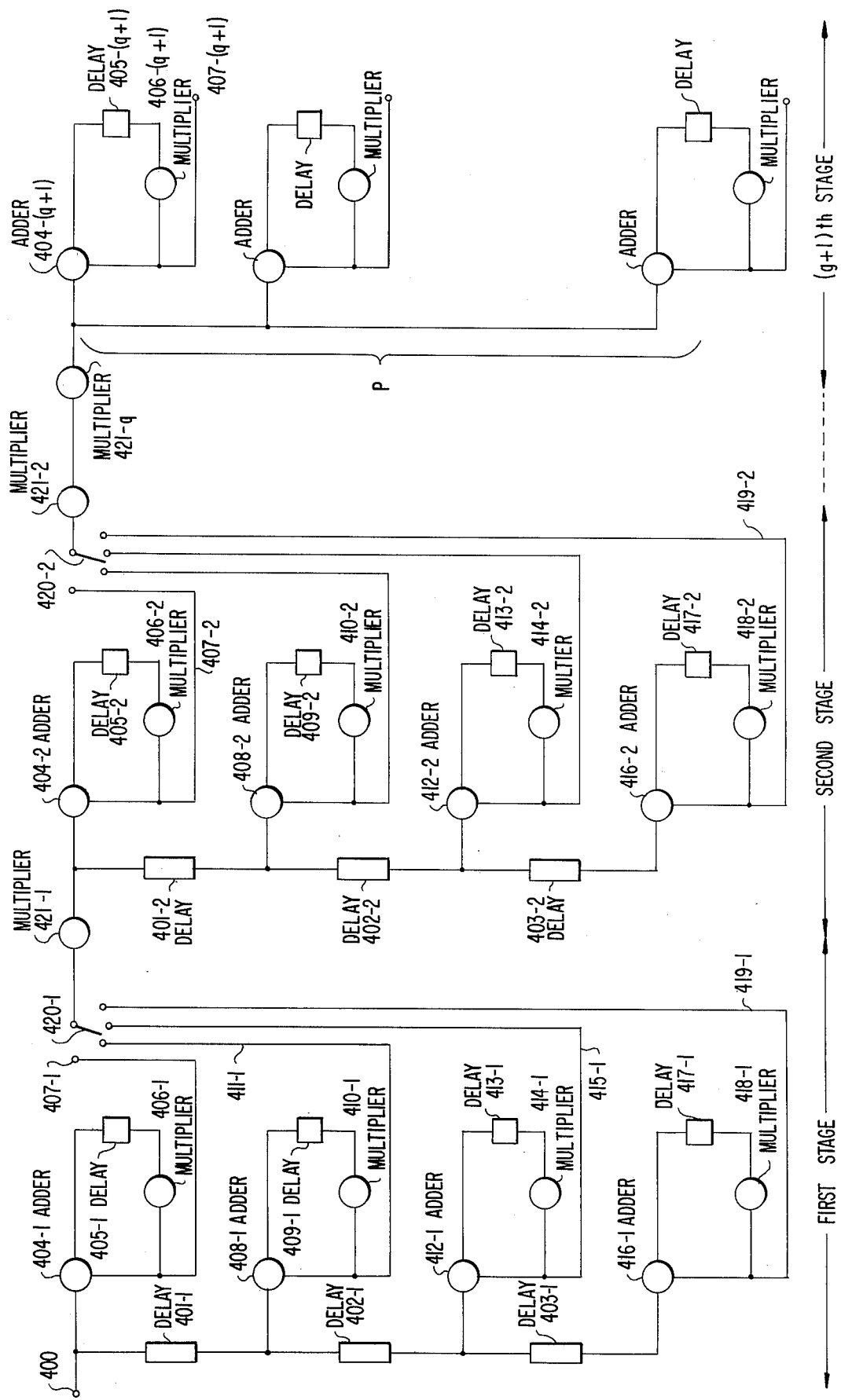
FIG. 4 shows a schematic circuit diagram of one embodiment of the present invention.

FIG. 4 shows one embodiment of the present invention based on the aforementioned approach. Input digital data $x$ are successively given to an input terminal 400 in serial form, and processed in four arithmetic circuits consisting of adders 404-1, 408-1, 412-1 and 416-1, N/4 data delay elements 405-1, 409-1, 413-1 and 417-1, and multipliers 406-1, 410-1, 414-1 and 418-1 for multiplying $+1, j, -1$ and $-j$, respectively. It is to be noted here that for the purpose of multiplication of these coefficients, the ordinary multipliers are unnecessary. The output signals of said four arithmetic circuits appear at terminals 407-1, 411-1, 415-1 and 419-1, respectively, and they are sequentially selected through a switch 420-1 to another multiplier 421-1. Therefore, the time when the output signals obtained from the four arithmetic circuits are fed to the multiplier 421-1 is delayed by a period of N/4 data from each other. Therefore, in the case where the same N-point input data series $\{x_k\}$ ($k=0, 1 \ldots N-1$) are used in common to the arithmetic circuits to obtain the N-point DFT $\{X_l\}$ ($l=0, 1 \ldots N-1$), it is necessary to preliminarily delay the data fed to these arithmetic circuits a period of N/4 data in sequence. For this reason, delay elements 401-1, 402-1 and 403-1 for delaying a period of N/4 data are interposed between the input terminals of these arithmetic circuits and the input terminal 400.

However, in case where the frequency analysis of continuously given speech signals, the delay elements 401-1, 402-1 and 403-1 can be dispensed with, because the present unit can be adapted for input data series other than a particular input data series (consisting of N digital data). More definitely, every vowel sound includes strong characteristic frequency components almost independent upon speakers so that by the detection of the strong frequency components, we can know what vowels have been uttered. Therefore, in the recognition of vowel sounds with the use of a voice recognition machine, it is necessary to perform frequency analysis of the vowel sounds by means of FFT processing. In this case, based on the fact that each vowel sound is uttered for a considerably long period, the frequency analysis can be fully attained by ordinary N frequency components from the same four input data series which are shifted by a period of N/4 data with each other in place of said one particular input data series. In such a case, the same four data series are supplied directly to the input terminals of the adders 404-1, 408-1, 412-1 and 416-1, respectively, so that the delay elements 401-1, 402-1 and 403-1 may be omitted. The multiplier 421 sequentially multiplies the output signals of the switch 420-1 by coefficients $W^0$, $W^n$, $W^{2n}$ ... $W^{(M-1)n}$, respectively. In FIG. 4, the circuit section up to this point from the left forms the first stage.

The second stage has a similar construction to the first stage with the only differences being the delay time of delay elements 401-2, 402-2, 403-2 and 405-2, 409-2, 413-2, 417-2 included in the second stage is equal to a period of N/4 data, and that the coefficients multiplied by a multiplier 421-2 are $W^0$, $W^{4n}$, $W^{8n}$ ... $W^{([N/16]-1)n}$.

Subsequently, in a similar manner, the respective stages are constructed up to the $q$th stage. The last, that is, the $(q+1)$th stage is composed of P arithmetic circuits arranged in parallel to each other, each arithmetic circuit consisting of an adder 404-$(q+1)$, a delay element for delaying a period of 1 datum 405-$(q+1)$, and a multiplier 406-$(q+1)$, and the coefficients multiplied by the respective multipliers are 1 1/P as will be evident from the equation (15). N/P results of the DFT appear sequentially at the respective output terminals 407-$(g+1)$ (P in number).

In the frequency analysis of vowels as described previously, since these N results of the DFT respectively represent the intensities of the respective frequency components in each vowel, it can be known what vowels have been uttered. Namely, examining what frequency components are especially strong with a simple logic circuit connected to the respective output terminals 407-$(q+1)$ and an appropriate memory device employed externally. As described above, with the present invention, voice recognition is made possible, but since it has no direct bearing on the subject matter of this invention, more detailed description thereof will be omitted.

The circuit shown in FIG. 4 can be realized by serial arithmetic means and delay elements composed of hardware such as a shift register, and simple control and timing. As a result, its circuit construction becomes simple. Multipliers are provided one for each stage and P−1 in the last stage. For such multipliers, the so-called pipe-line multiplier as shown in FIG. 10 on page 417 of Reference 4 is suitable, and the operation speed could be equal to the data input speed.

Now, description will be made on the control of the respective circuit elements in the unit shown in FIG. 4. Since all the circuit elements of FIG. 4 are formed in a digital manner, they are controlled by clock pulses. Word pulses for performing separation of each of N-point input digital data and of data supplied into the circuit are derived from the clock pulses, and in response to the word pulses, all the operations are performed. Especially, if the form of the data is serial, bit pulses for controlling each bit are necessary, and by counting down these bit pulses, the word pulses are obtained. In addition, another counter (not shown) for connecting the word pulses so as to monitor how many data have been given to the input terminal 400 is provided, and simultaneously, its output is used to control connection operations for the switches 420-1, 420-2 . . .

Figure 7:
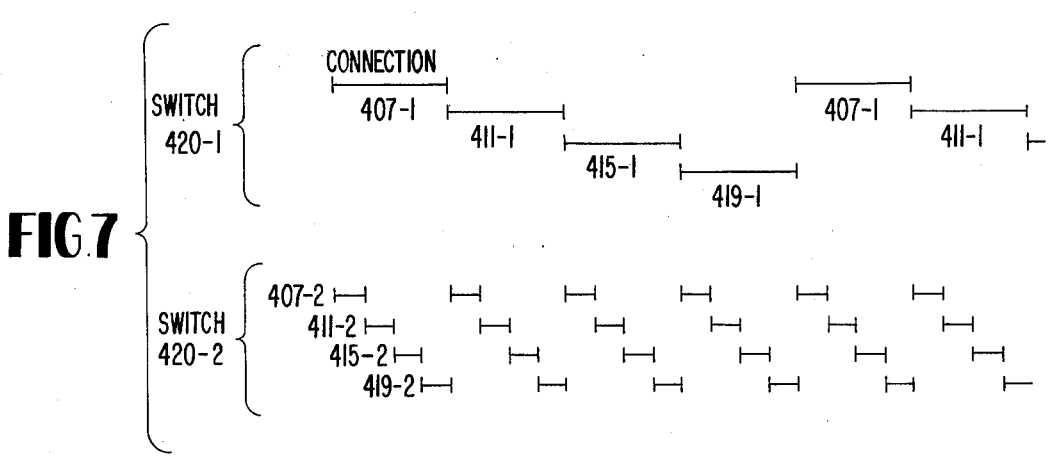
FIG. 7 diagramatically shows operations of the switches shown in FIG. 4.

As illustrated by the timing diagram in FIG. 7, the switch 420-1 connects its common terminal to terminals 407-1, 411-1, 415-1 and 419-1 successively, the switch 420-2 connects its common terminal to terminals 407-2, 411-2, 415-2 and 419-2 successively, and these operations are repeated.

More detailed description of the circuit for generating the above-described control signals will be omitted here, because it is not related to the subject matter of the present invention, and because it can be easily realized with the use of known techniques.

One example of the known FFT processing unit is exemplified in FIG. 6 on page 225 of Reference 2. However, that illustrated unit requires very complicated control and voluminous hardware. For this reason, the present invention is more advantageous. For instance, in the case of data points $N = 4^q$, the comparison between these units with respect to circuit-size and control is performed as shown in Table.

Table

| | Unit in Prior Art (Reference 2) | Present Unit |
|---|---|---|
| Number of Multiplications | $\frac{N}{2} \log_2 N$ | $\frac{3N}{8} \log_2 N$ |
| Number of Multipliers | $\log_2 N$ | $\frac{1}{2} \log_2 N$ |
| Number of Adders | $2 \log_2 N$ | $2 \log_2 N$ |
| Number of Delay Elements | about $\frac{3}{2}$ N (data) | about $\frac{4}{3}$ N (data) |
| Control | Fairly complicated | Simple |

The present unit of FIG. 4 is composed of cascaded processing stages each consisting of 4 recursive arithmetic paths in which the coefficients to be multiplied are ±1 and ±$j$, a switch and a multiplier. However, a similar processing to that performed by the unit of FIG. 4 can be done by using at least one of said processing stages and by using other hardware constructions.

Furthermore, in connection with the above description, equation (1) for matrix representation of the DFT is partitioned into four groups as shown in equation (4) and so, the processing unit as exemplified in FIG. 4 is obtained, equation (1) may be partitioned into two groups as follows:

$$\begin{pmatrix} X_n \\ X_{n+2} \\ X_{n+4} \\ \vdots \\ X_{n+2(\frac{N}{2}-1)} \end{pmatrix} = \begin{pmatrix} W^0, & W^n, & W^{2n}, & & W^{(N-1)n} \\ W^0, & W^{n+2}, & W^{2(n+2)}, & & \\ W^0, & W^{n+4}, & W^{2(n+4)}, & & \\ \vdots & \vdots & & & \vdots \\ W^0, & W^{n+2(\frac{N}{2}-1)} & \text{---} & \text{---} & W^{(N-1)\{n+2(\frac{N}{2}-1)\}} \end{pmatrix} \quad (16)$$

$n = 0, 1$

By similar operations to those described previously based on this equation (16), a similar FFT processing unit can be designed. Namely, by omitting the details of the intermediate equations because they are mostly the same as these described previously, another FFT processing unit of the present invention can be realized based on the analysis of equation (16) as shown in FIG. 5. In this figure, input digital data $x$ are successively applied to an input terminal 500 in serial form, and are processed in two arithmetic circuits constructed by adders 502-1 and 505-1, delay elements for delaying a period of N/2 data 503-1 and 506-1, and 506-1, and multipliers 504-1 and 507-1 for multiplying +1 and −1, respectively. Also, these multipliers may be very simple circuits. A delay element 501-1 for delaying a period of N/2 data may be omitted depending upon the application of the present unit as described already in the description with reference to FIG. 4. The output signals obtained from said two arithmetic circuits are alternately derived for every N/2 data through a switch 510-1 so that they are given to a multiplier 511-1 through terminals 508-1 and 509-1. In this multiplier 511-1, the derived data are multiplied by coefficients $W^0, W^n, W^{2n} \ldots W^{([N/2]-1)n}$ ($n=0, 1$). In FIG. 5, the circuit section up to this point from the left is depicted as the first stage. Subsequently, in a similar manner, the second, third . . . and 2$q$th stages can be constructed. The last $(2q+1)$th stage has the same structure as the $(q+1)$th stage of FIG. 4.

The circuit of FIG. 5 is constructed entirely in serial form with simple control similar to the circuit of FIG. 4.

The present FFT processing unit can be used for the purpose of performing operations for detecting particular frequency components in various fields including the analysis of earthquake waves and brain waves, and radar signal processing in addition to the speech signal analysis as mentioned previously.

Although description has been made in detail above especially in connection to the processing unit for performing FFT processing, this is no more than one representative example, and of course, the present invention is applicable to the case where other similar operations are performed. Also, various modifications and alternatives may be made within the scope of the present invention.

What is claimed is:

1. An FFT processing unit comprising one or more serially connected arithmetic stages, each arithmetic stage having
    a. a plurality of recursive arithmetic paths, each recursive arithmetic path consisting of
        1. a delay element,
        2. a simplified multiplier means fed with an output signal obtained from said delay element for multiplying said output signal by any one of $\pm 1$ and $\pm j$ where $j$ is equal to $\sqrt{-1}$, and
        3. an adder means fed with a serial input digital data series and an output signal of the simplified multiplier means at its first and second input terminals, respectively, and feeding its output signal to an input terminal of the delay element,
    said recursive arithmetic paths being connected in parallel so that said serial input digital data series are given at their respective input terminals;
    b. a switch means for successively selecting output signals obtained from said plurality of recursive arithmetic paths; and
    c. a second multiplier means for multiplying input signals given through said switch means by predetermined coefficients.

2. An FFT processing unit as claimed in claim 1 in which said simplified multiplier means selectively passes a multiplicand datum in the intact form, reverses its polarity, interchanges a real term and an imaginary term thereof, or combines these operations.

3. An FFT processing unit as claimed in claim 1 in which said each arithmetic stage further contains a plurality of second delay elements connected in series, both ends and intermediate junction points of the series connected second delay elements being respectively connected to a corresponding first input terminal of the adder means in each recursive arithmetic path and said serial input digital data series being given to an input terminal of the arithmetic stage which is connected to one end of the series connected second delay elements, whereby a particular section of the serial input digital data series may be given to the respective input terminals of said plurality of recursive arithmetic paths at different time points delayed by a given period.

4. An FFT processing unit as claimed in claim 1 wherein the number of recursive arithmetic paths in each arithmetic stage is four.

5. An FFT processing unit as claimed in claim 1 wherein the number of recursive arithmetic paths in each arithmatic stage is two.

6. An FFT processing unit as claimed in claim 1 wherein the number of arithmetic stages is two or more and the last stage is composed of P parallel recursive arithmetic paths where P is not a multiple of four, the outputs of the FFT processing unit appearing sequentially at the outputs of the multiplier means in the recursive arithmetic paths in said last stage.

7. An FFT processing unit comprising one or more serially connected arithmetic stages, each arithmetic stage having
    a. a plurality of recursive arithmetic paths, each recursive arithmetic path consisting of
        1. a simplified multiplier means for multiplying by any one of $\pm 1$ and $\pm j$ where $j$ is equal to $\sqrt{-1}$, 2. a delay element for delaying an output signal obtained from the simplified multiplier means, and
3. an adder means fed with a serial input digital data series and an output signal of the delay element at its first and second input terminals, respectively, and feeding its output signal to an input terminal of the simplified multiplier means, said recursive arithmetic paths being connected in parallel so that said serial input digital data series are given at their respective input terminals;

b. a switch means for successively selecting output signals obtained from said plurality of recursive arithmetic paths, and c. a second multiplier means for multiplying input signals given through the switch means by predetermined coefficients.

8. An FFT processing unit as claimed in claim 7 in which said simplified multiplier means selectively passes a multiplicand datum in the intact form, reverses its polarity, interchanges a real term and imaginary term thereof, or combines these operations.

9. An FFT processing unit as claimed in claim 7 in which said each arithmetic stage further contains a plurality of second delay elements connected in series, both ends and intermediate junction points of the series connected second delay elements being respectively connected to a corresponding first input terminal of the adder means in each recursive arithmetic path, and said serial input digital data series being given to an input terminal of the arithmetic stage which is connected to one end of the series connected second delay elements, whereby a particular section of the serial input data series may be given to the respective input terminals of said plurality of recursive arithmetic paths at different time points delayed by a given period.

10. An FFT processing unit as claimed in claim 7 wherein the number of recursive arithmetic paths in each arithmetic stage is four.

11. An FFT processing unit as claimed in claim 7 wherein the number of recursive arithmetic paths in each arithmetic stage is two.

12. An FFT processing unit as claimed in claim 7 wherein the number of arithmetic stages is two or more and the last stage is composed of P parallel recursive arithmetic paths where P is not a multiple of four, the outputs of the FFT processing unit appearing sequentially at the outputs of the delay means in the recursive arithmetic paths in said last stage.

* * * * *

UNITED STATES PATENT AND TRADEMARK OFFICE
CERTIFICATE OF CORRECTION

PATENT NO. : 4,058,715
DATED : November 15, 1977
INVENTOR(S) : Kunihiko NIWA

It is certified that error appears in the above-identified patent and that said Letters Patent are hereby corrected as shown below:

IN THE SPECIFICATION:

Column 1, line 26 - delete "in" insert -- is --

Column 4 -- delete the fourth equal sign in Eq. (7) insert a -- • --

Column 8 - in fourth ( ) of Eq. (15) insert vertical dashes -- | -- between 3rd and 4th 0's on left Column 9, line 51 - delete (g+1) insert -- (q+1) --

Column 11, line 25 - delete "and 506-1," (second occurrence)

Signed and Sealed this

Eighteenth Day of April 1978

[SEAL]

Attest:

RUTH C. MASON
Attesting Officer

LUTRELLE F. PARKER
Acting Commissioner of Patents and Trademarks